O. C. GEORGE.
DUMPING BODY.
APPLICATION FILED MAY 31, 1919.

1,389,642.

Patented Sept. 6, 1921.
3 SHEETS—SHEET 1.

Witnesses:
W. P. Kilroy
Harry R. Levlute

Inventor:
Ollie C George
By Brown Cortener & Vinnes
Attys.

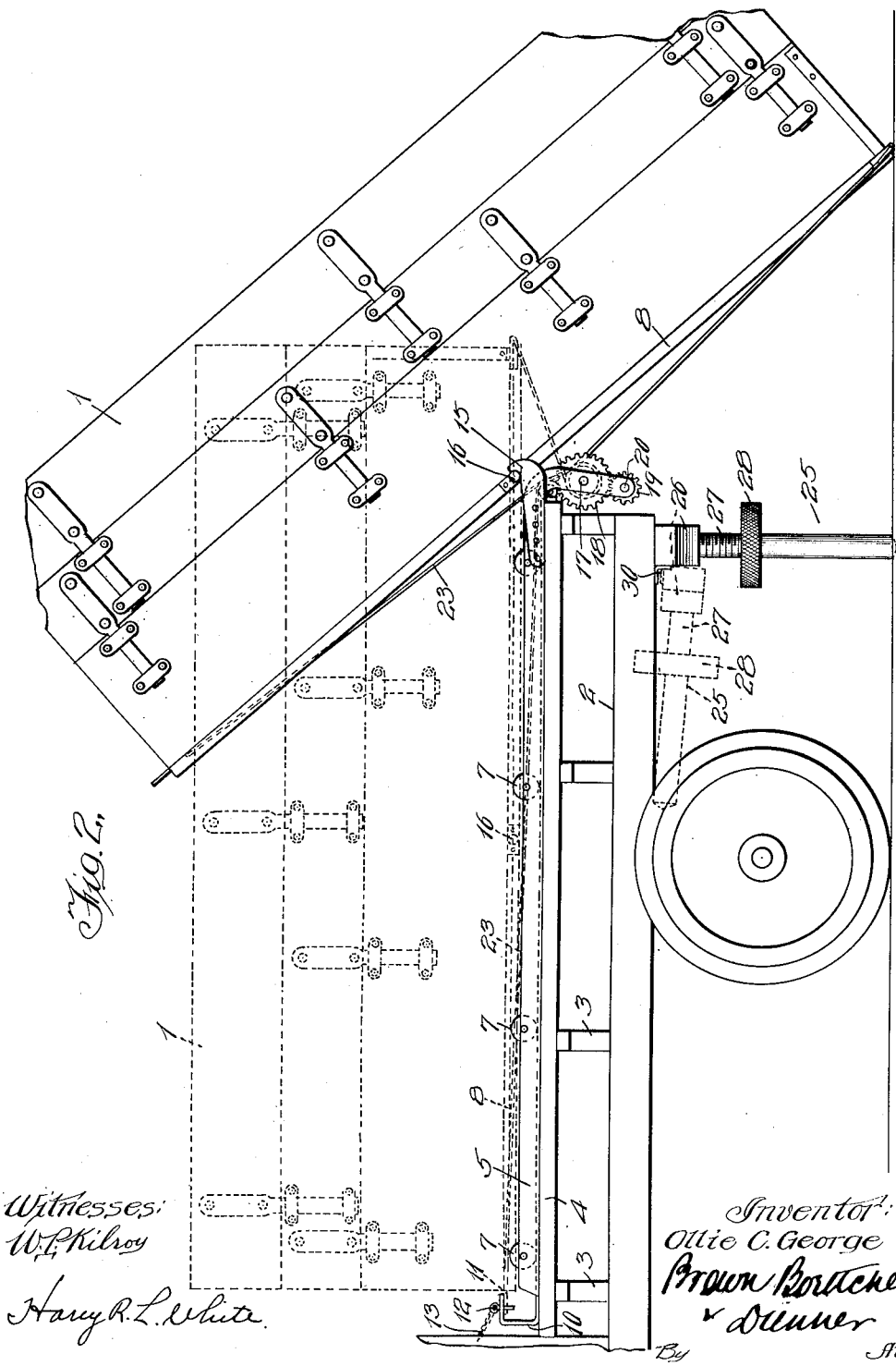

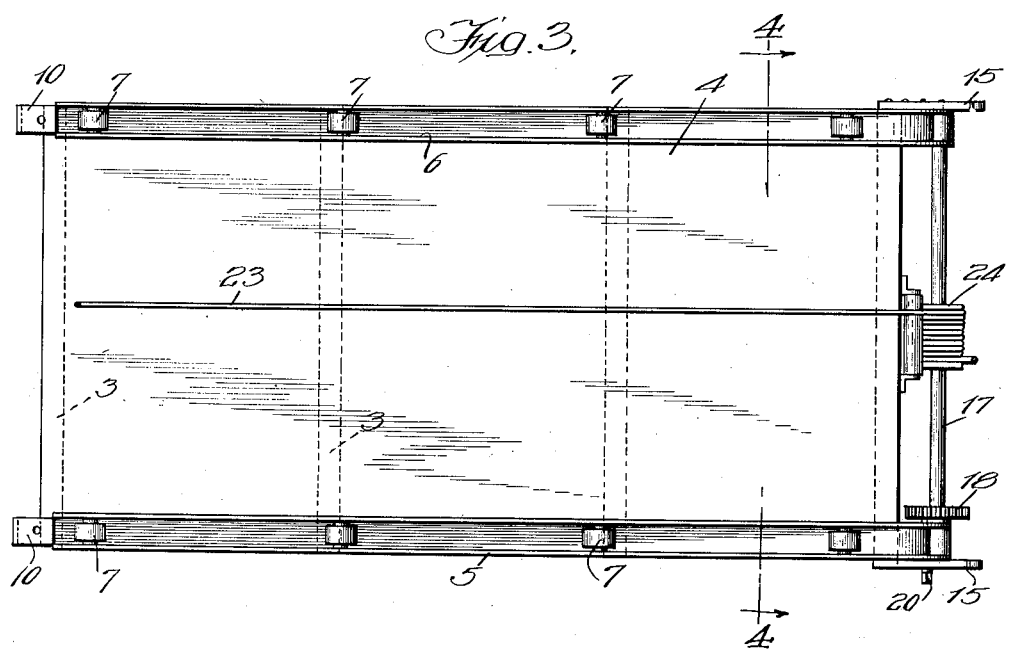
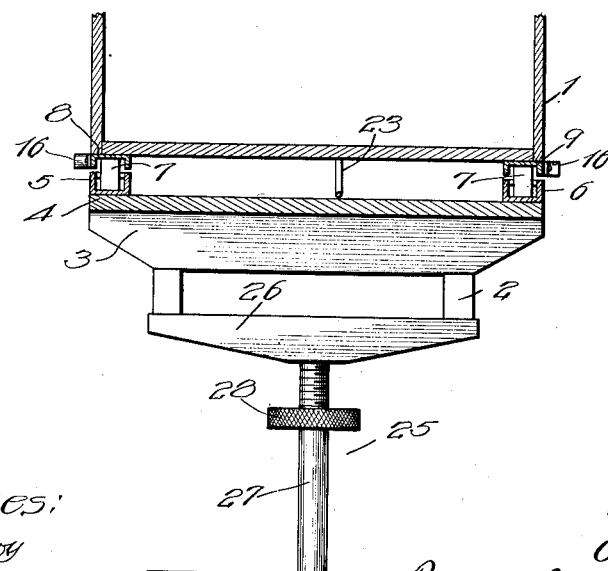

UNITED STATES PATENT OFFICE.

OLLIE C. GEORGE, OF CHICAGO, ILLINOIS.

DUMPING-BODY.

1,389,642.

Specification of Letters Patent.

Patented Sept. 6, 1921.

Application filed May 31, 1919. Serial No. 300,996.

*To all whom it may concern:*

Be it known that I, OLLIE C. GEORGE, a citizen of the United States, residing at Chicago, in the county of Cook and State of Illinois, have invented a certain new and useful Improvement in Dumping-Bodies, of which the following is a full, clear, concise, and exact description, reference being had to the accompanying drawings, forming a part of this specification.

My invention relates to motor vehicles, wagons, trucks and the like and is directed particularly to an improved dumping body for use in connection therewith.

My invention aims to provide a simple and reliable dumping body mounting and operating arrangement which will be universal in its application to various types of vehicles now in the trade and which will permit of the employment of a dumping body of maximum size with respect to the size of the vehicle upon which it is to be mounted and will at the same time provide a low center of gravity and high order of stability in the resulting combination.

In accordance with the teachings of my invention I have provided a dumping body constituting a unitary structure adapted to be readily installed in connection with various types of vehicles now on the market. When it is desired to perform a dumping operation the body is adapted to be moved longitudinally along the vehicle and tilted. Upon completion of the dumping operation the body of my invention is adapted to be again restored to its normal position upon the truck and locked in place.

In order that those skilled in the art may be fully acquainted with the nature and scope of my invention I shall describe a specific embodiment of the invention in connection with the accompanying drawings which form a part of the present specification and wherein, Figure 1 is a side elevational view of a truck embodying my invention;

Fig. 2 is an enlarged fragmentary view showing the body in dumping position; the normal position of the body upon the truck being shown in dotted lines;

Fig. 3 is a plan view of the rear platform portion of the truck with the dumping body removed; and Fig. 4 is a transverse sectional view taken on the line 4—4 of Fig. 3.

Figure 1:
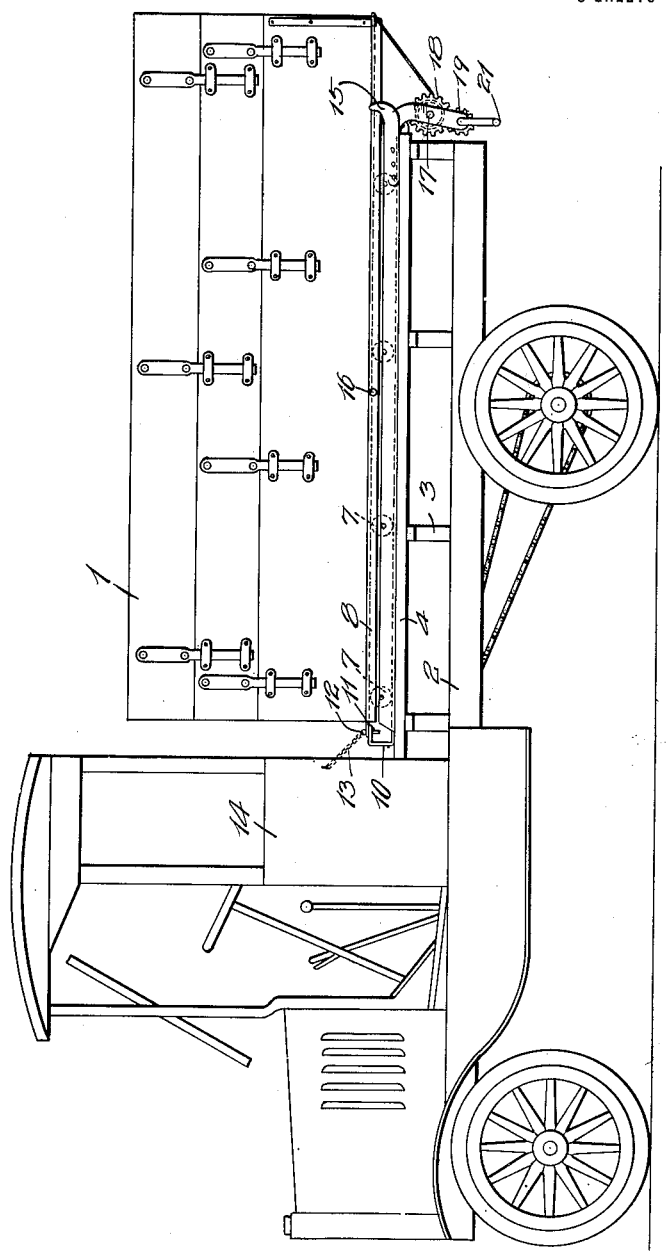

Referring to the drawings, it will be seen that the dumping body 1 constitutes a unitary structure. This body 1 may be of any desired construction, preferably provided with removable sides and end gates as shown, although this is immaterial.

The chassis of the particular vehicle shown comprises a frame 2 carrying a plurality of transverse bolsters 3 upon which transverse bolsters 3 is mounted a horizontal platform 4. The horizontal platform 4 is typical of the various types of platforms provided in connection with various types of stake bodies, panel bodies and the like now on the market.

In converting a stake body or a panel body—for example—into a dumping body in accordance with the teachings of my invention, the vertical stakes or panels, as the case may be, are removed from the platform 4. Channel irons 5 and 6 are bolted or otherwise removably mounted upon the upper surface of the horizontal platform 4; one channel extending longitudinally adjacent each of the opposite edges respectively of the platform 4, as shown in Figs. 3 and 4.

A plurality of rollers 7 journaled in each of the channel irons 5 and 6 facilitates longitudinal movement of the dumping body 1 relative to the platform 4 as will hereinafter be apparent. A pair of tracks or channel irons 8 and 9 bear upon the upper peripheries of the rollers 7. These tracks or channel irons 8 and 9 are secured in inverted position upon the bottom of the body 1, extending longitudinally therealong in substantial vertical alinement with the longitudinal channels 5 and 6 respectively, carried by the horizontal platform 4. The dumping body 1 is guided longitudinally along the platform 4 by the coöperation of the inverted channels 8 and 9 with the rollers 7; transverse displacement of the body 1 relative to the platform 4 being effectively prevented by the downwardly extending or vertical flanges of these channels.

When the vehicle is traveling with the dumping body 1 loaded the body is locked upon the platform 4 in the position shown in Figs. 1 and 2 to prevent accidental displacement thereof. The inner ends of the horizontal portions or bases of the channel irons 5 and 6 are bent back as shown at 10, the vertical flanges of these channels being preferably cut away at this point to facilitate such formation. The inverted channels 5 and 6 carried by the body 1 extend beyond the forward end of the body as shown in Fig. 2, the vertical flanges of these channels being cut away beyond the body 1 as shown, if so desired. The horizontal flanges of these channels which are adapted to engage in the bent back portions 10 of the channels 8 and 9 are provided with suitable apertures or openings, which openings are adapted to register with openings provided in the bent back portions 10 when the body 1 is moved into the position shown in Fig. 1. Suitable locking bolts 12 are then inserted through these registering openings to securely lock the dumping body in place, these locking bolts being removed by the driver when it is desired to dump the load carried by the body 1, as will be hereinafter described. In order that the locking bolts 12 will be readily accessible at all times, they are preferably arranged upon suitable chains 13 secured to the cab 14 of the vehicle.

The channel irons 5 and 6 are provided with hook shaped stops or abutments 15 riveted or otherwise suitably secured to their outer vertical flanges adjacent the rear end of the frame of the truck.

Outwardly extending pivot studs or trunnions 16 mounted upon the outer vertical flanges of the inverted channels 8 and 9 are adapted to engage the hook shaped stops or abutments 15 to arrest rearward movement, horizontally, of the dumping body 1 and to form bearings upon which the body 1 tilts by gravity to dump its load.

Longitudinal movement of the dumping body 1 along the platform 4 is effected by means of a winch mounted in the rear downwardly curved ends of the channel irons 5 and 6. This winch preferably comprises a drum shaft 17, the opposite ends of which bear in the channel irons 5 and 6 respectively. A relatively large spur gear 18 is fixed upon the drum shaft 17 adjacent one end thereof. A pinion 19 fixed upon a crank shaft 20 meshes with the spur gear 18; rotation of relatively great power being transmitted to the drum shaft 17 through these coöperating gears by rotating the crank shaft 20 by means of a suitable detachable crank handle 21 shown in Fig. 1. One end of a suitable cable, flexible rope, chain or the like 23 is secured to the forward end of the dumping body 1 as shown in Figs. 1 and 2. The cable 23 extends from the forward end of the body 1 to the drum 24 carried by the drum shaft 17 and is wound about said drum a sufficient number of times to insure against slippage of the cable upon rotation of the drum, the opposite end of the cable 23 being secured to the rear end of the dumping body 1.

In dumping the load carried by the body 1, I preferably employ a jack 25 for bracing the rear end of the truck frame 2 to insure against tilting of the entire truck about the rear wheels thereof should the load be exceptionally heavy and the truck exceptionally light. This jack 25 comprises a transverse bracing member 26, the opposite ends of which are secured by means of hinges 30 to the longitudinally extending portions of the truck frame 2. The bracing member 26 is provided with a threaded post 27 which threaded post 27 is adapted to be threaded into or out of the bracing member—by means of an adjusting wheel 28—to increase or decrease the length of the post 27 as desired.

The jack 25 is normally carried under the frame 2 of the truck in the position shown in dotted lines in Fig. 2. By releasing the catch provided for retaining the jack in this position and swinging the jack about the hinges 30 into the position shown in full lines and rotating the adjusting wheel 28 and consequently the post 27 the lower end of this post is brought into contact with the ground or other surface supporting the truck to effectively brace the same.

Assume that the body 1 is in the position shown in dotted lines in Fig. 2 and it is desired to dump the load carried thereby. Upon removing the locking bolts 12 and arranging the bracing jack 25 beneath the rear end of the truck frame 2 to brace the same, as has been described, a suitable crank handle 21 is attached to the crank shaft 20 and the drum shaft 17 rotated thereby in a clockwise direction through the pinion 19 and the coöperating spur gear 18. Upon rotation of the drum shaft 17 in this manner the dumping body 1 is moved rearwardly over the stationary rollers 7, the cable extending to the forward end of the body being wound upon the drum and the length thereof decreased, while the cable extending to the rear end of the body 1 is accordingly unwound from the drum, increasing the length thereof to allow for this rearward movement of the body 1. It will now be apparent that I have provided for moving the dumping body longitudinally rearwardly along the platform 4 by means of a single length of cable which remains relatively taut at all times, thus exerting an even pull on the body 1.

As the body 1 is moved rearwardly in this manner the outwardly extending pivots or trunnions 16 carried by the channels 8 and 9 will engage the hook shaped stops or abutments 15 carried by the channels 5 and 6. This engagement prevents further rearward movement of the body 1, the hook shaped stops 15 forming bearings for the trunnions 16 about which the body 1 is tilted by gravity to dump its load.

Upon completing the dumping operation the body 1 is again brought to a horizontal position by attaching the crank handle 21 to the crank shaft 20 and rotating the drum shaft 17 in a counter clockwise direction, It will now be apparent that upon rotation of the drum shaft 17 in counter clockwise direction the cable extending to the rear end of the body 1 will be wound upon the drum 24 and the length thereof decreased while the length of the cable extending to the forward end of the body will be accordingly increased. In this manner the body 1 is brought first to a horizontal position and finally to its normal position upon the vehicle.

From the foregoing it will be apparent that I have provided a dumping body of the simplest construction and operation consistent with durability and effectiveness.

While I have described my invention with reference to the details of a particular embodiment it is to be understood that this embodiment is merely illustrative and I do not intend thereby to limit the invention to such details, but intend that all such modifications as will suggest themselves to one skilled in the art be considered within the scope of my invention. For example, it will at once be apparent to one skilled in that art that the body 1 can be moved longitudinally along the platform 4 by power derived from the wheels of the vehicle, the engine or any other suitable source without departing from my invention. Suitable means might be provided for preventing tilting of the body 1 before the trunnions 16 engage the hook shaped abutments 15.

I claim:

1. In combination, a vehicle having a platform for receiving various types of interchangeable bodies, a pair of channel members removably mounted upon said platform, rollers journaled in said channel members, a dumping body, a pair of channel members carried by said dumping body and adapted for coöperation with said rollers to guide said body therealong, means carried by said first channel members for moving said body along said rollers, said means being arranged without the space between the vehicle platform and the dumping body to permit employment of a dumping body of maximum size and provide a low center of gravity and high order of stability in the resulting combination, a trunnion carried by the dumping body for limiting the movement thereof and fulcrum means carried by said first channel members for coöperation with said trunnion to form a pivot above which said body is tilted to dump its contents.

2. In combination, a vehicle having a platform for receiving various types of interchangeable bodies, a pair of channel members removably mounted upon said platform and projecting beyond the rear end thereof, a dumping body movable along said channel members in close proximity thereto, an operating winch carried by the projecting portions of said channel members for moving said body therealong, the projecting portions of said channel members being curved downwardly adjacent the rear of said platform to remove said operating winch from the space between said platform and said dumping body.

3. In combination, a vehicle having a platform for receiving various types of interchangeable bodies, a pair of roller carrying members removably mounted upon said platform, rollers journaled in said roller carrying members, a dumping body movable along said rollers relative the vehicle, means carried by said roller carrying members for moving said body along said rollers, said movement imparting means being positioned completely below the upper surface of the platform of the vehicle and removable as a unit with said roller carrying means and an actuating link between said movement imparting means and said body.

4. In combination, a vehicle having a platform for receiving various types of interchangeable bodies, a pair of roller carrying members removably mounted upon said platform, rollers journaled in said roller carrying members, a dumping body movable along said rollers relative the vehicle, a flexible element connected at its opposite ends with said dumping body, means carried by said roller carrying members and removable from the vehicle unitarily therewith for taking up the slack in said flexible element to move said body along said rollers, said movement imparting means being arranged without the space between the vehicle platform and the dumping body to permit employment of a dumping body of maximum size and provide a low center of gravity and high order of stability in the resulting combination.

In witness whereof I hereunto subscribe my name this 29 day of March, 1919.

OLLIE C. GEORGE.